United States Patent [19]

Ekeroth et al.

[11] Patent Number: 4,876,061
[45] Date of Patent: Oct. 24, 1989

[54] RESILIENTLY LOADED LATERAL SUPPORTS FOR CANTILEVER-MOUNTED ROD GUIDES OF A PRESSURIZED WATER REACTOR

[75] Inventors: Douglas E. Ekeroth, Plum Boro; Luciano Veronesi, O'Hara Township, Allegheny County, both of Pa.

[73] Assignee: Westinghouse Electric Corp., Pittsburgh, Pa.

[21] Appl. No.: 236,291

[22] Filed: Aug. 24, 1988

Related U.S. Application Data

[63] Continuation of Ser. No. 926,301, Nov. 3, 1986, abandoned.

[51] Int. Cl.⁴ .............................................. G21C 5/02
[52] U.S. Cl. ................................... 376/353; 376/362; 376/364
[58] Field of Search ............... 376/209, 285, 353, 362, 376/364, 446, 448, 449, 463

[56] References Cited

U.S. PATENT DOCUMENTS

| | | | |
|---|---|---|---|
| 3,164,530 | 1/1965 | Banks | 376/353 |
| 3,801,454 | 4/1974 | Kumpf | 376/463 |
| 3,878,042 | 4/1975 | Curulla et al. | 376/446 |
| 4,134,790 | 1/1979 | Bevilacqua et al. | 376/364 |
| 4,268,357 | 5/1981 | Formanek et al. | 376/364 |
| 4,298,434 | 11/1981 | Anthony et al. | 376/364 |
| 4,563,328 | 1/1986 | Steinke | 376/353 |
| 4,584,168 | 4/1986 | Formanek | 376/353 |
| 4,624,829 | 11/1986 | Jackson | 376/448 |
| 4,684,501 | 8/1987 | Lui | 376/446 |
| 4,684,502 | 8/1987 | Wilson et al. | 376/353 |
| 4,687,628 | 8/1987 | Gillett et al. | 376/353 |
| 4,707,331 | 11/1987 | Sherwood et al. | 376/353 |

FOREIGN PATENT DOCUMENTS

3020114 12/1981 Fed. Rep. of Germany ...... 376/353

Primary Examiner—Deborah L. Kyle
Assistant Examiner—Richard W. Wendtland
Attorney, Agent, or Firm—D. C. Abeles

[57] ABSTRACT

A pressurized water reactor of an advanced design comprises, in vertically spaced relationship, a lower barrel assembly having lower and upper core plates, an inner barrel assembly and an axially removable calandria assembly having a lower calandria plate. A plurality of rod guides are cantilever-mounted in parallel axial relationship within the inner barrel assembly and, specifically, are rigidly mounted at the lower ends thereof to the upper core plate. Axially extending sleeves are affixed to the upper ends of the rod guides and telescopingly receive therein generally cylindrical supports which are affixed to and depend downwardly from the lower calandria plate and define alignment axes for the respectively associated rod guides. Links are secured at first ends to the mount and extend radially therefrom at angularly displaced positions, second, free ends of the links being free to move in pivotal rotation from a normal, downward and radially inward position to an upward and radially outward position, when engaged by receiving means formed in the upper ends of the sleeves as the calandria assembly is moved into assembled relationship with the inner barrel assembly. In the assembled relationship, the links, moved fully to the upward and radially outward positions, produce resilient, lateral loading between the respective sleeves and cylindrical mounts and maintain alignment of the associated sleeves and rod guides with the respective alignment axes.

25 Claims, 7 Drawing Sheets

RESILIENTLY LOADED LATERAL SUPPORTS FOR CANTILEVER-MOUNTED ROD GUIDES OF A PRESSURIZED WATER REACTOR

This application is a continuation, of application Ser. No. 06/926,301, filed Nov. 3, 1986, now abandoned

BACKGROUND OF THE INVENTION

1. Field of the Invention

This invention relates to the pressure vessel of a pressurized water reactor system of an advanced design in which plural rod guides are cantilever-mounted at their lower ends and extend in parallel, vertical relationship to dispose the upper ends thereof adjacent a calandria assembly and, more particularly, to an improved, resiliently loaded lateral support between the top, free ends of the cantilever-mounted rod guides and the calandria assembly of an advanced design, pressurized water reactor.

2. State of the Relevant Art

Conventional pressurized water reactors employ a number of control rods which are mounted within the reactor vessel, generally in parallel axial relationship, for axial translational movement in telescoping relationship with the fuel rod assemblies. The control rods contain materials which absorb neutrons and thereby lower the neutron flux level within the core. Adjusting the positions of the control rods relatively to the respectively associated fuel rod assemblies thereby controls and regulates the reactivity and correspondingly the power output level of the reactor. Typically, the control rods, or rodlets, are arranged in clusters, and the rods of each cluster are mounted at their upper ends to a common, respectively associated spider. Each spider, in turn, is connected to a respectively associated adjustment mechanism for raising or lowering the associated rod cluster.

In certain advanced designs of such pressurized water reactors, there are employed both control rod clusters (RCC) and water displacement rod clusters (WDRC), and also so-called gray rod clusters which, to the extent here relevant, are structurally identical to the RCC's and therefore both are referred to collectively hereinafter as RCC's. In an exemplary such reactor design, a total of over 2800 reactor control rods and water displacement rods are arranged in 185 clusters, each of the rod clusters having a respectively corresponding spider to which the rods of the cluster are individually mounted. Further, there are provided, at successively higher, axially aligned elevations within the reactor vessel, a lower barrel assembly, an inner barrel assembly and a calandria assembly, each of generally cylindrical configuration; a removable, upper closure dome seals the top of the vessel and is removable to gain access to the vessel interior.

The lower barrel assembly has mounted therein, in parallel axial relationship, a plurality of fuel rod assemblies, comprising the reactor core. The fuel rod assemblies are supported at the lower and upper ends thereof, respectively, by corresponding lower and upper core plates. The inner barrel assembly comprises a cylindrical sidewall which is welded at its bottom edge to the upper core plate. Within the inner barrel assembly there are mounted a large number of rod guides disposed in closely spaced relationship, in an array extending substantially throughout the cross-sectional area of the inner barrel assembly. The rod guides are of first and second types, respectively housing therewithin the reactor-control rod clusters (RCC) and the water displacement rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower overall fuel costs. Consistent with this objective, the water displacement rodlet clusters (WDRC's) function as a mechanical moderator and provide spectral shift control of the reactor. Typically, a fuel cycle is of approximately 18 months, following which the fuel must be replaced. When initiating a new fuel cycle, all of the WDRC's are fully inserted into association with the fuel rod assemblies, and thus into the reactor core. As the excess reactivity level of the fuel diminishes over the cycle, the WDRC's are progressively, in groups, withdrawn from the core so as to enable the reactor to maintain the same reactivity level, even though the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reactor control operations.

A reactor incorporating WDRC's is disclosed in application Ser. No. 217,503, filed Dec. 16, 1980 and entitled MECHANICAL-SPECTRAL SHIFT REACTOR and in further applications cited therein. A system and method for achieving the adjustment of both the RCC's and WDRC's are disclosed in the co-pending application of Altman et al., entitled "DISPLACER ROD DRIVE MECHANISM VENT SYSTEM." Each of the foregoing applications is assigned to the common assignee hereof and is incorporated herein by reference.

A critical design criterion of such advanced design reactors is to minimize vibration of the reactor internals structures, as may be induced by the core outlet flow as it passes therethrough. A significant factor for achieving that criterion is to maintain the core outlet flow in an axial direction throughout the inner barrel assembly of the pressure vessel and thus in parallel axial relationship relative to the rod clusters and associated rod guides. The significance of maintaining the axial flow condition is to minimize the exposure of the rod clusters to cross-flow, a particularly important objective due both to the large number of rods and also to the type of material required for the WDRC's, which creates a significant wear potential. This is accomplished by increasing the vertical length, or height, of the vessel sufficiently such that the rods, even in their fully withdrawn (i.e., raised) positions within the inner barrel assembly, remain located below the vessel outlet nozzles, whereby the rods are subjected only to axial flow, and through the provision of a calandria assembly which is disposed above the inner barrel assembly thus above the level of the rods and which is designed to withstand the cross-flow conditions.

In general, the calandria assembly comprises a lower calandria plate and an upper calandria plate which are joined by a cylindrical side wall, and an annularly flanged cylinder which is joined at its lower cylindrical end to the upper calandria plate and is mounted by its upper, annularly flanged end on an annular supporting ledge of the pressure vessel. The rod guides are cantilever-mounted at their lower ends to the upper core plate and at their upper ends to the lower calandria plate. Within the calandria assembly and extending between aligned apertures in the lower and upper calandria plates is mounted a plurality of calandria tubes, positioned in parallel axial relationship and respectively aligned with the rod guides. A number of flow holes are provided in the lower calandria plate, at positions displaced from the apertures associated with the calandria tubes through which the reactor core outlet flow passes as it exits from its upward passage through the inner barrel assembly. The Calandria assembly receives the axial core outlet flow, and turns the flow from the axial direction through 90° to a radially outward direction for passage through the radially oriented outlet nozzles of the vessel. The calandria thus withstands the cross-flow generated as the coolant turns from the axial to the radial directions, and provides for shielding the flow distribution in the upper internals of the vessel.

Advanced design pressurized water reactors of the type here considered incorporating such a calandria assembly are disclosed in the co-pending applications: Ser. No. 490,101 to James E. Kimbrell et al., for "NUCLEAR REACTOR"; application Ser. No. 490,059 to Luciano C. Veronesi for "CALANDRIA"; and application Ser. No. 490,099, "NUCLEAR REACTOR", all thereof concurrently filed on Apr. 29, 1983 and incorporated herein by reference.

Maintenance of such reactors, for example, requires that the upper closure dome be removed to provide access to the calandria assembly which in turn is removed to afford access to the WDRC and RCC rod clusters for repair or replacement, and as well to the core for rearrangement or replacement of the fuel rod assemblies. To accomplish this, the calandria assembly typically is removable from the inner barrel assembly, withdrawing thereby the WDRC and RCC rods from within the corresponding rod guides.

As before noted, the rod guides for each of the RCC and WDRC rod clusters are mounted rigidly at their bottom ends to the upper core plate, preferably by being bolted thereto, and extend in parallel axial relationship to dispose the upper, free ends thereof adjacent the lower calandria plate. This cantilever-type mounting is necessitated to accommodate axial (i.e., vertical) movement of the free ends of the rod guides, which occurs due to thermal expansion and thus axial elongation of the rod guides, and fixed end motion caused by vibration and/or flexing of the upper core plate to which the bottom, fixed ends of the rod guides are mounted.

Because of these factors, it is not possible to rigidly and permanently secure the free ends of the rod guides to the lower calandria plate. Preferably, the design of the pressure vessel and particularly of the support structures which mount the free ends of the rod guides to the lower calandria plate permit both the assembly and removal of the calandria, relatively thereto, without special tools. Nevertheless, the mounting means for the free ends of the rod guides not only must constrain the same against lateral motion due to vibration, flow and thermal forces while accommodating the aforesaid axial movement of the free ends of the rod guides, but also must avoid wear of the reactor internals arising out of loads imposed on the guides and the previously discussed axial motion of the free ends of the guides.

In some existing designs and as used with conventional reactors, split pins are employed at the free ends of the rod guides for restricting lateral motion while permitting a limited extent of axial motion. Such designs, however, present wear concerns for the reasons above-noted. In fact, due to the high loads and large axial motion of the free ends in the advanced design pressure vessels, the use of split pins for the free end supports is deemed not practical.

There thus exists a substantial need for a top end support structure for the top, free ends of the rod guides in such advanced design reactors, which satisfies these complex structural and operational requirements but yet which is of simple design and employs a minimum number of parts, thereby to achieve cost economies both in the construction and also in the maintenance of such reactors.

CROSS-REFERENCE TO RELATED APPLICATIONS

The co-pending application of J. E. Gillett et al., entitled "TOP END SUPPORT FOR WATER DISPLACEMENT ROD GUIDES OF PRESSURIZED WATER REACTOR", assigned to the common assignee hereof and incorporated herein by reference, discloses a telescoping interconnection between a cylindrical support element which is affixed to and extends downwardly from the lower calandria plate and an apertured sleeve affixed to the top end of each rod guide. The configuration of the telescoping elements maximizes the area of the wear surface, thereby to resist wear during normal operation, while affording ease of removal of the calandria to gain access to the rod clusters and of reassembly of same, for the reasons aforenoted.

An alternative top end support assembly is disclosed in the co-pending application of Gillett et al. entitled "FLEXIBLE ROD GUIDE SUPPORT STRUCTURE FOR INNER BARREL ASSEMBLY OF PRESSURIZED WATER REACTOR", assigned to the common assignee hereof and incorporated herein by reference. Respective, differently configured top support plates are mounted on the free ends of the RCC and the WDRC rod guides, respectively, and have mating, respective exterior and interior vertices to permit assemblage of same in an interdigitized array. Flexible linkages connect the top plates in a concatenated relationship, and serve to restrain relative, lateral movement therebetween while permitting independent axial movement. Stop pins are received in aligned bores of the contiguous interdigitated top plates and serve to limit the extent of load which can be applied to the linkages and thus the ultimate extent of relative movement between the concatenated top plates. The RCC top plates include openings, preferably of cylindrical configuration, which receive corresponding cylindrical extensions which are secured to and extend downwardly from the lower calandria plate, thereby establishing basic alignment of the concatenated and interleaved matrices of the plates. Leaf springs secured to the calandria bottom plate engage and exert a downward force on the top surfaces of the RCC top plates, thereby establishing a frictional force which further opposes lateral movement of the RCC top plates and correspondingly, through the concatenated and interleaved arrangement, any lateral movement of the WDRC top plates, as well, while permitting restrained axial displacement, or movement, of the individual RCC and WDRC rod guides. While the flexible support structure of the referenced Gillett et al. application satisfies many of the requirements of the rod guide top end supports, the structure is of complex design and requires the use of numerous elements, contributing to increased costs of construction and maintenance of the reactor.

Accordingly, there remains a need for a lateral support for the top, free ends of the cantilever-mounted rod guides of the pressurized water nuclear reactors of the advanced designs herein contemplated, which is of simplified design and reduced cost, yet which affords the requisite support functions while reducing and/or substantially eliminating wear concerns.

SUMMARY OF THE INVENTION

In accordance with the present invention, an improved lateral support is provided at the interface between the upper, free ends of cantilever-mounted rod guides and the lower calandria plate of a calandria assembly, as employed in a pressurized water reactor of the advanced design type herein contemplated. While the improved lateral support of the invention is directed to the particular problems presented by such advanced design pressurized water reactors, it will be appreciated that the lateral support of the invention may be employed in other reactors with the alignment and lateral top end support requirements are imposed even though the further concerns of vibration and axial movement of the rod guides are not as severe a concern.

More particularly, an extension element having a central aperture therethrough, corresponding to an aperture in the lower calandria plate which accommodates a drive rod for an associated rod cluster, is aligned axially with a respectively corresponding aperture in the lower calandria plate and secured to the lower calandria plate so as to depend downwardly therefrom. Plural pivotal mounting sockets defining horizontal axes of rotation are formed in the extension element, each socket receiving and pivotally mounting therein a first end of a corresponding link, the plurality of links extending generally radially and in angularly displaced relationship relatively to the common axis of the aligned apertures. The top end of each rod guide includes a plurality of corresponding receiving sockets, each receiving socket having a mating configuration with respect to the free end of a corresponding link for releasably receiving and engaging same.

The number of links and associated mounting and receiving sockets, and the corresponding angular relationships thereof are determined in accordance with the configuration of the top end of the associated rod guide. Illustratively, for a rod guide top end of generally square cross-sectional configuration, four such links and respectively associated mating and receiving sockets are provided, the links being relatively angularly displaced at right angles and extending radially outwardly from the extension element so as to engage and be received in correspondingly disposed receiving sockets in the top end of the associated rod guide.

In use, as the calandria assembly is lowered into the pressure vessel, the links are normally pivoted downwardly, through force of gravity, and thus disposed at radially inwardly, retracted or disengaged positions. The corresponding receiving sockets formed at the upper and inner portions of the corresponding rod guide top end define an engagement ledge which is aligned with the free end of the link in its inwardly retracted position. As the downward movement of the calandria assembly continues, the free end of each link contacts the engagement ledge and is pivoted thereby upwardly and thus moved radially outwardly, to a releasably engaged position in its corresponding receiving socket in the assembled position of the calandria. Removal of the calandria is performed simply by lifting the calandria this causes the links to pivot downwardly and the free ends to move inwardly, thereby being withdrawn from the receiving sockets to the normal, retracted positions.

The links may assume any of various configurations, the principle requirement being that a limited degree of lateral, i.e., radially oriented, flexibility be afforded through the resulting connection between the extension element and the rod guide top end. This is afforded in different embodiments of the lateral support of the present invention, alternatively by use of link configurations which themselves afford a required degree of flexibility in the lateral, or radial direction, or by the use of links of more rigid configuration but wherein the receiving socket is flexibly mounted in the top end of the associated rod guide.

In all of these embodiments of the invention, the links are loaded laterally into the top end of the rod guide, and serve to center same, both maintaining the intended alignment and preventing lateral motion of the rod guide; further, since the links remain capable of pivotal movement even in the engaged position, they accommodate, through slight pivotal movement, axial movement of the free ends of the rod guides as may be produced by axial thermal growth and vibrations. The resiliently loaded lateral supports of the present invention thus provide for substantially rigid lateral restraint of the rod guide top, free ends, translating lateral forces from the rod guides directly to the calandria bottom plate and thus maintaining alignment and eliminating lateral movement of the rod guide free ends, while allowing axial, vertical motion for accommodating axial thermal expansion growth and base plate and related rod guide axial vibrations. The support, moreover, facilitates both the installation and the removal of the calandria, as required for routine maintenance and inspection operations.

These and other advantages of the present invention will become more apparent from the following detailed description, taken with reference to the enclosed figures, in which like reference numerals and letters refer to like parts throughout.

BRIEF DESCRIPTION OF THE DRAWINGS

FIGS. 1A and 1B, in the composite, comprise an elevational view, partially in crosssection, of a pressurized water reactor of the advanced design type with which the resiliently loaded lateral supports for the cantilever-mounted rod guides, in accordance with the present invention, are intended to be employed;

DESCRIPTION OF THE PREFERRED EMBODIMENTS

Figure 1B:
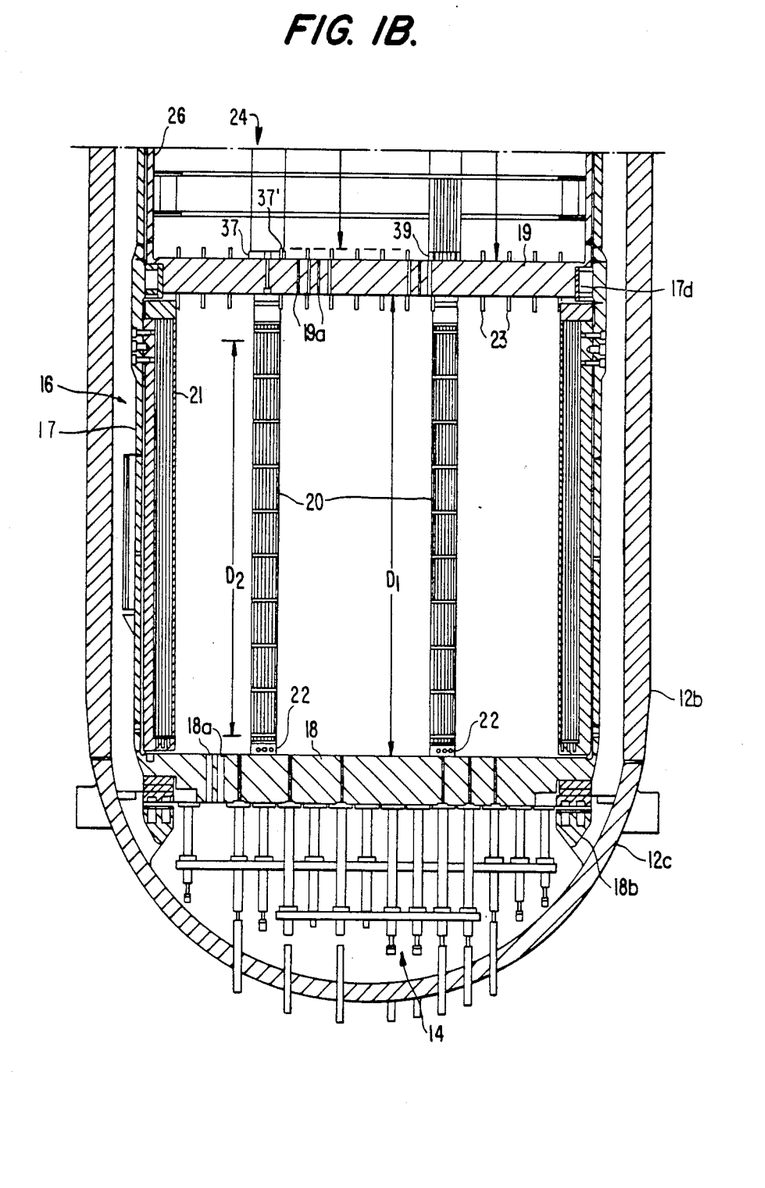

The composite of FIGS. 1A And 1B (referred to hereinafter as FIG. 1) is an elevational view, partly in cross-section, of a pressurized water reactor 10 comprising a pressure vessel 12 including an upper dome, or head assembly, 12a, cylindrical sidewalls 12b, and a bottom closure 12c comprising the base of the reactor 10. Plural radially oriented inlet nozzles 11 and outlet nozzles 13 (only one (1) of each appearing in FIG. 1) are formed in the sidewall 12b, adjacent the upper, annular end surface 12d of the sidewall 12b. Whereas the cylindrical sidewall 12b may be integrally joined, as by welding, to the bottom closure 12c, the head assembly 12a is removably received on the upper, annular end surface 12d of the sidewall 12b and secured thereto. The sidewall 12b further defines an inner, generally annular mounting ledge 12e for supporting various internal structures as later described. Within the bottom closure 12c, as schematically indicated, is so-called bottom-mounted instrumentation 14.

The lower barrel assembly 16 comprises a generally cylindrical sidewall 17, affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and closely adjacent to the outlet nozzle 13, for each such nozzle. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 22 carried by the lower core plate 18 and by pinlike mounts 23 carried by, and extending through, the upper core plate 19. Flow holes 18a and 19a (only two of which are shown in each instance) are provided in predetermined patterns, extending substantially throughout the areas of the lower and upper core plates 18 and 19, respectively. The flow holes 18a permit passage of a reactor coolant fluid into the lower barrel assembly 16 in heat exchange relationship with the fuel rod assemblies 20, which comprise the reactor core, and the flow holes 19a permit passage of the core output flow into the inner barrel assembly 24. A neutron reflector and shield 21 is mounted interiorly of the cylindrical sidewalls 17, in conventional fashion.

The inner barrel assembly 24 includes a cylindrical sidewall 26 which is integrally joined at its lower edge to the upper core plate, 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrical sidewall 26, are positioned a plurality of rod guides in closely spaced, parallel axial relationship; for simplicity of illustration, only two such rod guides are shown in FIG. 1, namely rod guide 28 housing a cluster 30 of radiation control rods (RCC) and a rod guide 32 housing a cluster 34 of water displacement rods (WDRC). The rods of each RCC cluster 30 and of each WDRC cluster 34 are mounted individually to respectively corresponding spiders 100 and 120. Mounting means 36 and 37 are provided at the respective upper and lower ends of the RCC rod guide 28 and, correspondingly, mounting means 38 and 39 are provided at the respective upper and lower ends of the WDRC rod guide 32. The lower end mounting means 37 and 39 rigidly mount the respective rod guides 28 and 32 to the upper core plate 19, as illustrated for the RCC rod guide mounting means by bolt 37'. The upper mounting means 36 and 38 mount the respective rod guides 28 and 32 to a calandria assembly 50, and particularly to a lower calandria plate 52.

The calandria assembly 50, in more detail, comprises a generally cylindrical, flanged shell 150 formed of a composite of the flange 50a, an upper connecting cylinder 152 which is welded at its upper and lower edges to the flange 50a and to the upper calandria plate 54, respectively, and a lower connecting cylinder, or skirt, 154 which is welded at its upper and lower edges to the upper and lower calandria plates 54 and 52, respectively. The lower connecting cylinder, or skirt, 154 includes an opening 154a aligned with each of the outlet nozzles 13 such that the axial core outlet flow received within the calandria 52 through the openings 52a in the lower calandria plate 52 may turn through 90° and exit radially from within the calandria 52 through the opening 154a to the outlet nozzle 13. The annular flange 50a is received on the flange 26a to support the calandria assembly 50 on the mounting ledge 12e. Plural, parallel axial calandria tubes 56 and 57 are positioned in alignment with corresponding apertures in the lower and upper calandria plates 53 and 54, to which the calandria tubes 56 and 57 are mounted at their respective, opposite ends.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63 flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacement mechanisms (DRDM's) 66 for the water displacement rod clusters (WDRC's) 34 may be in accordance with the disclosure of U.S. Pat. No. 4,439,054-Veronesi, assigned to the common assignee hereof.

The respective drive rods (not shown in FIGS. 1A and 1B) associated with the CRDM's 64 and the DRDM's 66 are structurally and functionally the equivalent of elongated, rigid rods extending from the respective CRDM's 64 and DRDM's 66 to the respective clusters of radiation control rods (RCC's) 30 and water displacement rods (WDRC's) 34, and are connected at their lower ends to the spiders 100 and 120 Apertures 58 and 59 in the lower calandria plate accommodate the corresponding drive rods. The CRDM's and DRDM's 64 and 66 thus function through the corresponding drive rods to control the respective vertical positions of, and particularly, selectively to lower and/or raise, the RCC's 30 and the WDRC's 34 through corresponding openings (not shown) provided therefore in the upper core plate 19, telescopingly into or out of surrounding relationship with the respectively associated fuel rod assemblies 20. In this regard, the interior height $D_1$ of the lower barrel assembly 16 is approximately 178 inches, and the active length $D_2$ of the fuel rod assemblies 20 is approximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34.

The flow of the reactor coolant fluid, or water, through the vessel 10 proceeds, generally, radially inwardly through a plurality of inlet nozzles 11, one of which is seen in FIG. 1, and downwardly through the annular chamber 15 which is defined by the generally cylindrical interior surface of the cylindrical side wall 12b of the vessel 12 and the generally cylindrical exterior surface of the sidewall 17 of the lower barrel assembly 16. The flow then reverses direction and passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes 52a in the lower calandria plate 52. Thus, parallel axial flow conditions are maintained through both the lower and inner barrel assemblies 16 and 24.

Within the calandria 50, the flow in general turns through 90° to exit radially from a plurality of outlet nozzles 13 (one of which is shown in FIG. 1). The inlet coolant flow also proceeds into the interior region of the head assembly 12a through perimeter bypass passageways in the mounting flanges received on the ledge 12e. Particularly, a plurality of holes 170, angularly spaced and at a common radius, are formed in the flange 17a and provide axially-directed flow paths from the annular chamber 15 into the annular space 172 intermediate the spring 27 and the interior surfaces of the sidewalls of the vessel 12; further, a plurality of aligned holes 174 and 176 extend through the flanges 26a and 50a, the holes 174 being angularly oriented, to complete the flow paths from the annular space 172 to the interior of the head assembly 12a. The flow of coolant proceeds from the head region through annular downcomer flow paths defined interiorly of certain of the flow shrouds 60, 61 and calandria tubes 56, 57, as later described, from which the head coolant flow exits into the top region of the inner barrel assembly 24, just below the lower calandria plate 52, to mix with the core outlet flow and pass through the calandria 50, exiting from the outlet nozzles 13.

Figure 2:
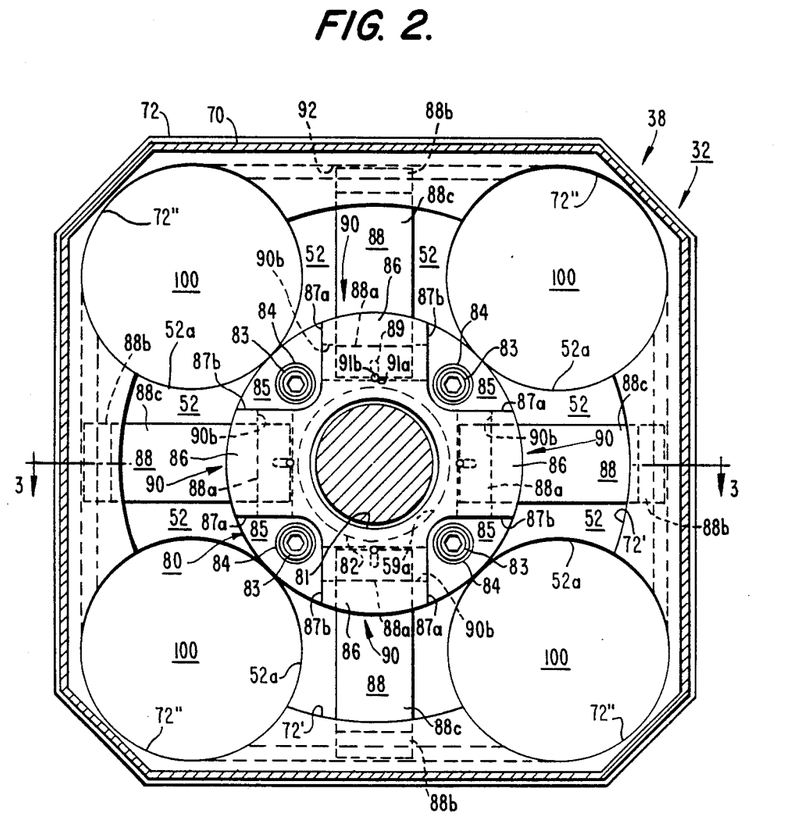
FIG. 2 is a bottom plan view, in partially schematic and simplified form, taken in a plane along the line 2—2 in FIG. 1A, illustrating the basic configuration of the resiliently loaded lateral supports of the present invention.

FIG. 2 is a bottom plan view of the resiliently loaded, top end lateral support in accordance with the present invention, taken along the line 2—2 in FIG. 1 and thus showing, in crosssection, an upper end portion of a WDRC rod guide 32 and a bottom plan view of the associated top end lateral support 38. The resiliently loaded, top end lateral support 38 furthermore will be described with concurrent reference to FIGS. 3 and 4, which respectively comprise simplified, or schematic, cross-sectional elevational views taken along the line 3—3 in FIG. 2 and respectively showing the lateral support of the invention in the engaged and disengaged relationships, as between the calandria bottom plate 52 and the lateral support 38 of a WDRC rod guide 32. It will be understood that the lateral support 38 of the present invention, in each of its various embodiments disclosed herein, is not restricted for use with the WDRC rod guides 32 but instead may be employed with the top end support 36 of an RCC rod guide 28.

The WDRC rod guide 32, throughout substantially its entire axial length, comprises a relatively thin metal sidewall 70 of generally square cross-sectional configuration which carries, at its upper extremity, a reinforced, generally coaxial sleeve 72 having an outer, generally square cross-sectional configuration corresponding to the outer perimeter of the thin sidewall 70. The sleeve 72 is permanently joined, such as by welding, at its bottom end to the top end of the thin sidewall 70 at their respective, common outer perimeters. The sleeve 72 is machined to define a generally cylindrical interior sidewall 72′ and, further, to define arcuate recesses 72″ which are in alignment with the outer portion of respectively corresponding openings 52a in the lower calandria plate 52 so as to maintain non-obstructed flow holes 100.

In accordance with the invention, a cylindrical mount 80 having a central aperture 81 therethrough is positioned on the lower calandria plate 52 with the aperture 81 thereof in alignment with a corresponding aperture 59 in the lower calandria plate 52. The mount 80 furthermore includes an annular extension 82 which is received in a corresponding annular recess 59a in the lower surface of the lower calandria plate 52, which affords lateral locking of the cylindrical mount 80 to the lower calandria plate 52. Bolts 83 (FIG. 2) are received through suitable countersunk bores 84 and threaded holes (not shown) provided in the lower calandria plate 52, for securing the cylindrical mount 80 to the latter. Preferably, the mount 80 is machined to define mounting segments 85 of reduced vertical thickness in which the countersunk bores 84 are formed. There are thus defined integral, equiangularly spaced arms 86, each arm 86 further being defined by a pair of vertical sidewalls 87a, 87b.

Figure 3:
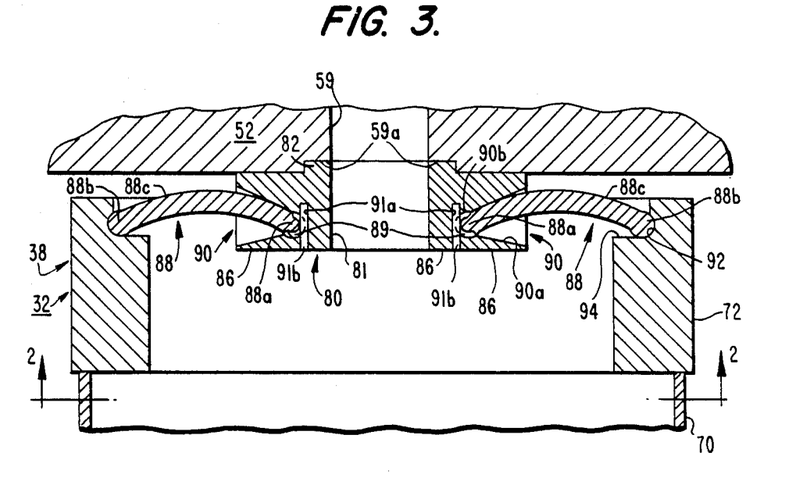
FIG. 3 is a simplified and fragmentary, elevational cross-sectional view, taken along the line 3—3 in FIG. 2, illustrating a first embodiment of the resiliently loaded lateral supports of the present invention when in engaged relationship.

Pivotal links 88, shown schematically in FIG. 2, and which may have any of various configurations as illustrated hereinafter, are pivotally secured at their first ends in corresponding mounting sockets 90 in the integral arms 86 and are releasably engaged at their opposite, free ends in receiving sockets 92 formed in the upper, inner portions of the sleeve 72. As best seen in FIG. 3, each of the mounting sockets 90 includes an open channel portion 90a and a socket portion 90b corresponding in configuration and dimensions to that of the first end 88a of the link 88. Particularly, the first end 88a and the socket portion 90b have mating, generally cylindrical surfaces, the socket portion 90b encompassing an arc greater than 180° so as to retain the first end 88a of the pivotal link 88 therein while permitting limited pivotal movement of the link 88 through an arc, or angle, defined by the channel 90a.

With reference to FIG. 2, it will be understood that the socket portion 90b is machined through the full width of the corresponding integral arm 86 and thus is open, or accessible, at the sidewalls 87a and 87b to permit sliding the first end 88a of the pivotal link 88 into the socket portion 90b. Further, an annular groove 89 is formed in the surface of the socket portion 90b, midway of the axial length thereof, and a hole 91a is formed so as to extend through the integral arm 86, perpendicular to the axis of rotation of the first end 88a of the pivotal link 88 and so as to intersect the annular groove 89, and a pin 91b is inserted through the hole and passes tangentially through the annular groove 89 for axially locking the first end 88a within the mounting socket 90, while permitting free pivotal movement thereof.

The receiving sockets 92 likewise have a mating configuration with respect to the second, free ends 88b of the corresponding links 88, but surround the latter through an angular extent of less than 180° such that the second, free ends 88b are releasably engaged thereby. The links 88 are of sufficient width (in the plane of FIG. 2) and thickness (in the plane of FIG. 3) so as to afford sufficient strength and stability so as to maintain a relative non-rotational and centered relationship between the cylindrical mount 80 and the sleeve 72, as now more fully described FIG. 3, as before noted, illustrates the installed position of the calandria 50, and more particularly the lower calandria plate 52, with respect to the sleeve 72 of a representative WDRC rod guide 32 FIG. 4, on the other hand, indicates an interim step in the installation of the calandria assembly 50, and more particularly of the lower calandria plate 52 relative to the sleeve 72, the arrow A indicating the direction of movement for installation of the calandria 50. In the position shown in FIG. 4, the links 88 have pivoted downwardly by force of gravity, to the extent permitted by the channels 90a of the mounting sockets 90, to disengaged positions at which the second, free ends 88b of the links 88 have rotated axially inwardly to retracted positions in alignment with the ledges 94. As the calandria 50 is lowered further in the direction of arrow A, the links 88 engage the aligned ledges 94 and are rotated, or pivoted, upwardly thereby in the direction indicated by arrows B and thus move radially outwardly, travelling along the ledges 94, toward the receiving sockets 92. In the fully installed position of the calandria 50, shown in FIG. 3, the respective axes of the link ends 88a and 88b and of the sockets 90 and 92 are in substantially a common horizontal plane.

The links 88 preferably are bowed upwardly in a central portion 88c, intermediate the ends 88a and 88b; further, they are of sufficient flexibility in a radial direction as to be compressed in the fully installed position of FIG. 3, and thereby loading of the sleeve 72 relative to the fixed mount to prevent lateral motion of the sleeve 72 and its associated rod guide. On the other hand, vertical motion due to axial growth and axially directed vibrations is accommodated by the pivoting movement of the links 88 which remains, even in the engaged position of FIG. 3.

It will be appreciated that removal of the calandria is equally simple, merely requiring that the calandria 50 be lifted. This causes the links to pivot, or rotate downwardly relative to the cylindrical mount 80 by force of gravity, whereby the second, free ends 88b thereof move radially inwardly, thereby being released from the engaged positions within the receiving sockets 92, to the disengaged and retracted positions shown in FIG. 4.

Figure 4:
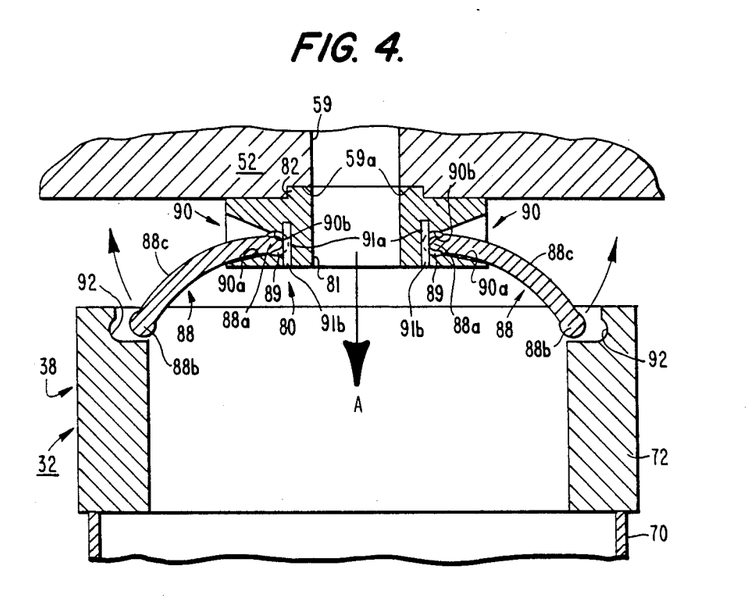
FIG. 4 is a view, similar to that of FIG. 3, of the first embodiment of the present invention, illustrating the disengaged and retracted relationship of the resiliently loaded lateral supports.

Several alternative embodiments of the pivotal links are possible, and all thereof fall within the scope of the invention. Examples thereof are set forth in the following FIGS. 5 through 8, each of which comprises a fragmentary and simplified, cross-sectional elevational view; in each of FIGS. 5 through 7, the engaged position of the links, as in FIG. 3 hereof, is shown in solid lines and the disengaged or retracted position of the links, as in FIG. 4, is shown in phantom lines. Corresponding elements in the successive FIGS. 5 through 8 are identified by corresponding, but respectively succeeding "100's" digits, i.e., "100," "200,".

Figure 5:
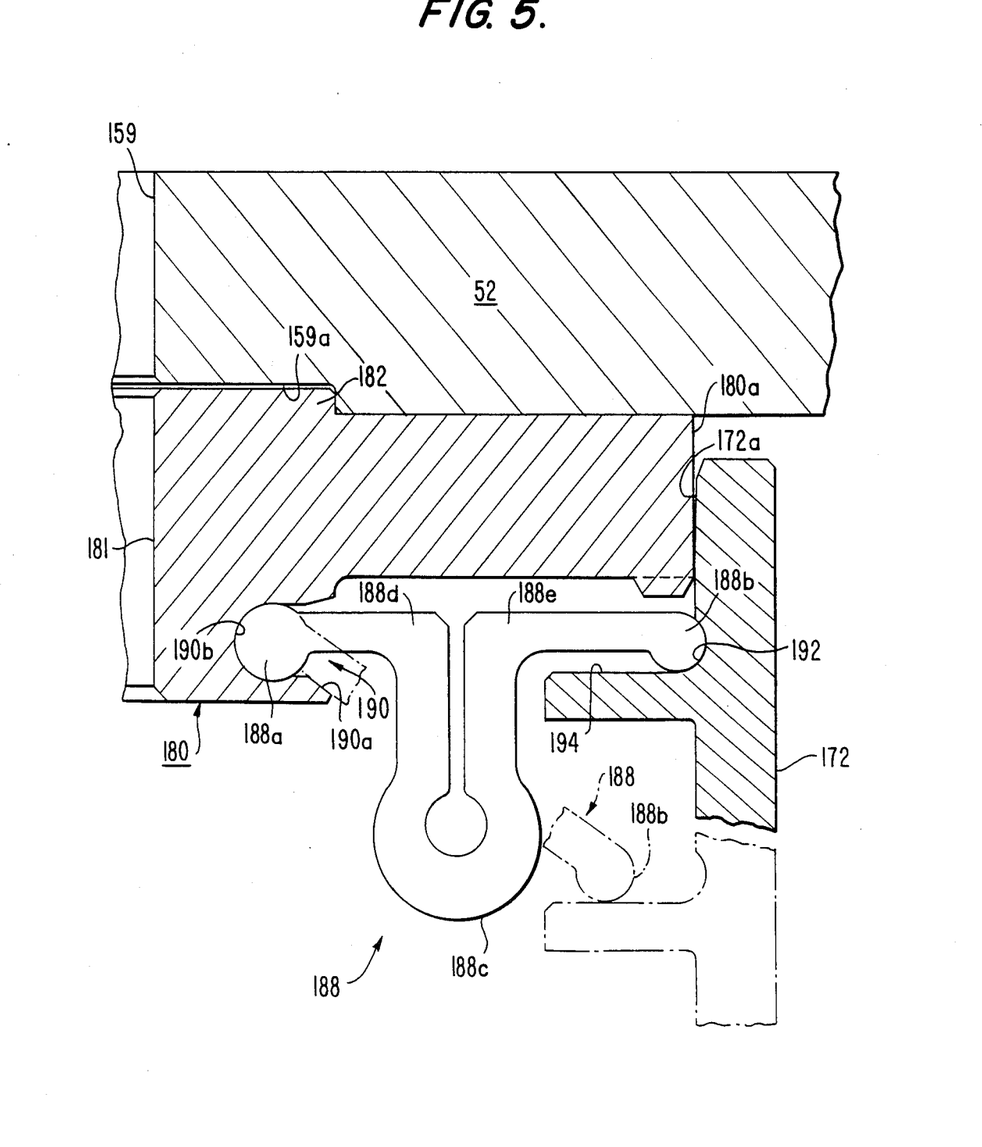
FIG. 5 is a view, similar to that of FIG. 3, of a second embodiment of the resiliently loaded lateral supports of the present invention, illustrating in solid lines the engaged relationship and in phantom lines the disengaged and retracted relationship thereof.

In FIG. 5, accordingly, the cylindrical mount 180 is attached to the lower calandria plate 52 with the respective central apertures 181 and 159 thereof in alignment. An annular extension 182 of the mount 180 is received in an annular recess 159a. The link 188 includes a first end 188a pivotally mounted within the socket portion 190b of mounting socket 190. The link 188 of FIG. 5 differs from the link 88 of FIGS. 3 and 4, in that the central portion 188c thereof is "U-shaped", thereby to afford the required lateral resiliency. This configuration permits the legs 188d and 188e to assume a flat profile, as contrasted to the bowed profile of the central portion 88c of the links 88 of FIG. 3. As also is apparent in FIG. 5, the cylindrical mount 180 may be of substantially the same outer diameter as the interior diameter of the sleeve 172, such that the respective, contiguous cylindrical surfaces 180a and 172a thereof are in close proximity. The flat configuration of the link 188 facilitates this configuration of the cylindrical mount 180 Should transverse, or lateral, forces exceed the resilient loading force of the links 188, the surface 180a of the cylindrical mount 180 serves as an abutment stop, against excessive, or extreme, lateral displacement of the sleeve 172 Conversely, these surfaces 180a and 172a are normally separated and in spaced, concentric relationship due to the resilient loading force of the links 188, such that abrasion and wear concerns are effectively eliminated. As also seen in FIG. 5, the sleeve 172 includes a ledge 194 and a receiving socket 192 in which the free end 188b of the illustrative link 188 is received, in its engaged position. The disengaged position of link 188 is illustrated in phantom lines in FIG. 5, the free end 188b being shown as resting on the ledge 194 of the sleeve 172. The embodiment of FIG. 5 has the same functional operation with regard to the pivotal movement of the link 188 between the engaged and disengaged positions and correspondingly during installation or removal of the calandria assembly, as described in relation to FIGS. 3 and 4.

Figure 6:
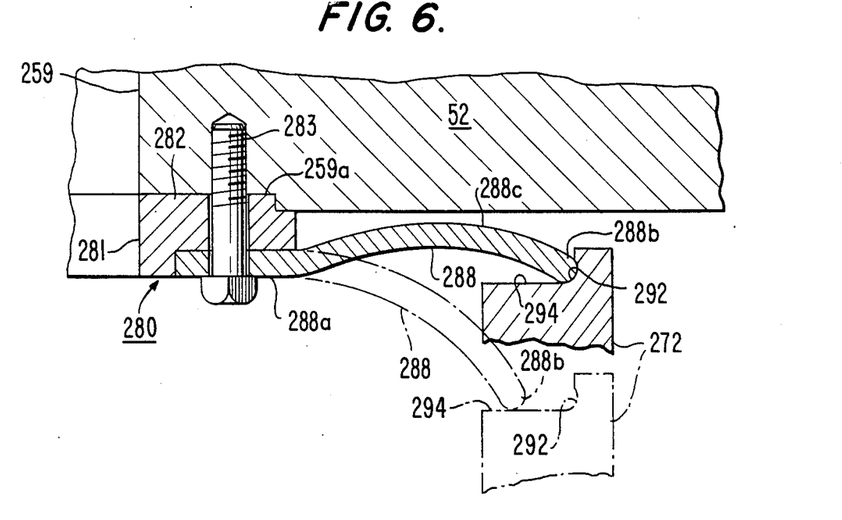
FIG. 6 is a view, similar to that of FIG. 3, of a third embodiment of the resiliently loaded lateral supports of the present invention, illustrating in solid lines the engaged position and in phantom lines the disengaged and retracted relationship thereof.

FIG. 6 illustrates a third embodiment of the present invention which affords the same functional characteristics as the previously discussed embodiments, but in which the link 288 is formed of a flexible material which permits the pivotal action described for the links of the prior embodiments. More particularly, the first end 288a of the link 288 is clamped securely to the cylindrical mount 280 by a bolt 283 which commonly secures, therefore, both the link 288 and the mount 280 to the lower calandria plate 52. The second, free end 288b similarly is received on the ledge 294 of the sleeve 272 during installation of the calandria 50. As that installation continues, the link 288 is caused to flex in the region adjacent the mount 280 to a more generally horizontal orientation in the completely installed position of the calandria 50, and in which position the free end 288b is received in the receiving socket 292 in accordance with the solid line positions of those elements. During removal of the calandria 50, the link 288 returns to its normal, downwardly pivoted and radially retracted position shown in phantom lines.

Figure 7:
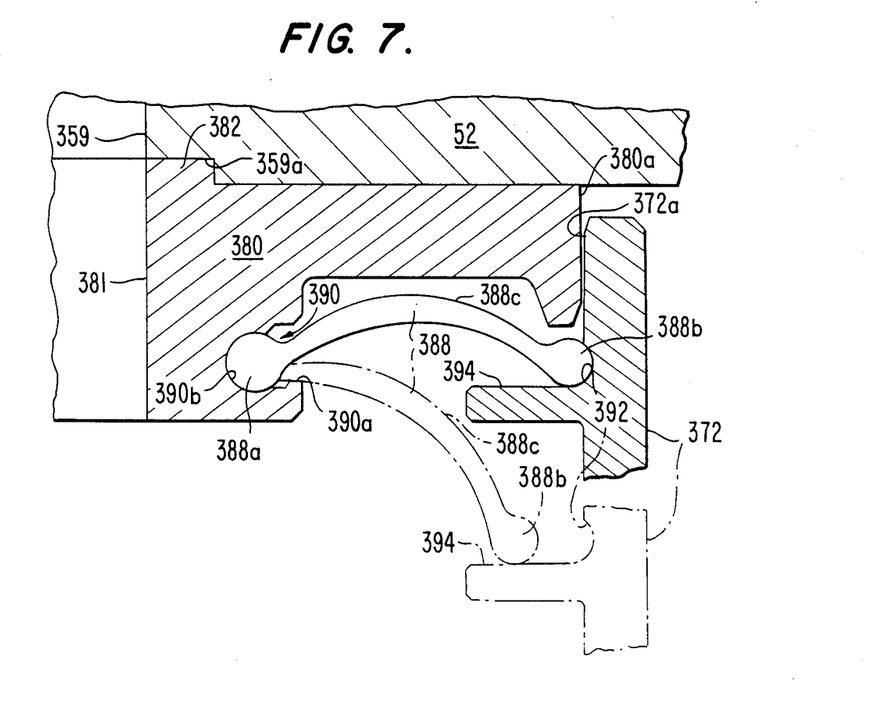
FIG. 7 is a view, similar to that of FIG. 3, of a fourth embodiment of the resiliently loaded lateral supports of the present invention, illustrating in solid lines the engaged relationship and in phantom lines the disengaged and retracted relationship thereof.

FIG. 7 illustrates yet another embodiment of the present invention, which combines several features of the embodiments of FIGS. 3, 4 and 5. Specifically, the cylindrical mount 380 is secured to the lower calandria plate 52 with the respective central apertures 381 and 359 thereof in alignment, an annular extension 382 being received in a mating annular recess 359a in the lower calandria plate 52. The cylindrical mount 380, as in the case of FIG. 5, is of sufficient radial extent so as to dispose its outer cylindrical surface 380a immediately adjacent the inner cylindrical surface 372a of the sleeve 372, thereby to function as a rigid abutment limiting the extent of lateral movement of the sleeve 372 and its associated rod guide Link 388 may correspond substantially to link 88 of FIGS. 3 and 4, the cylindrical mount 380 being configured to afford sufficient clearance to accommodate the bowed central portion of link 388 in the installed position shown in solid lines, link 388 being under compression in that installed position as before described. The first and second ends 388a and 388b of the link 388 correspondingly are pivotally mounted in the socket portion 390b of the mounting socket 390 and releasably received and engaged in the receiving socket 392. In the downwardly pivoted position of link 388, as shown in dotted lines, the has rotated downwardly and inwardly and the free end 388b thereof has engaged ledge 394. Lip 390a of the socket 390 limits the extent of the downward, rotary or pivotal movement of the link 388.

Figure 8:
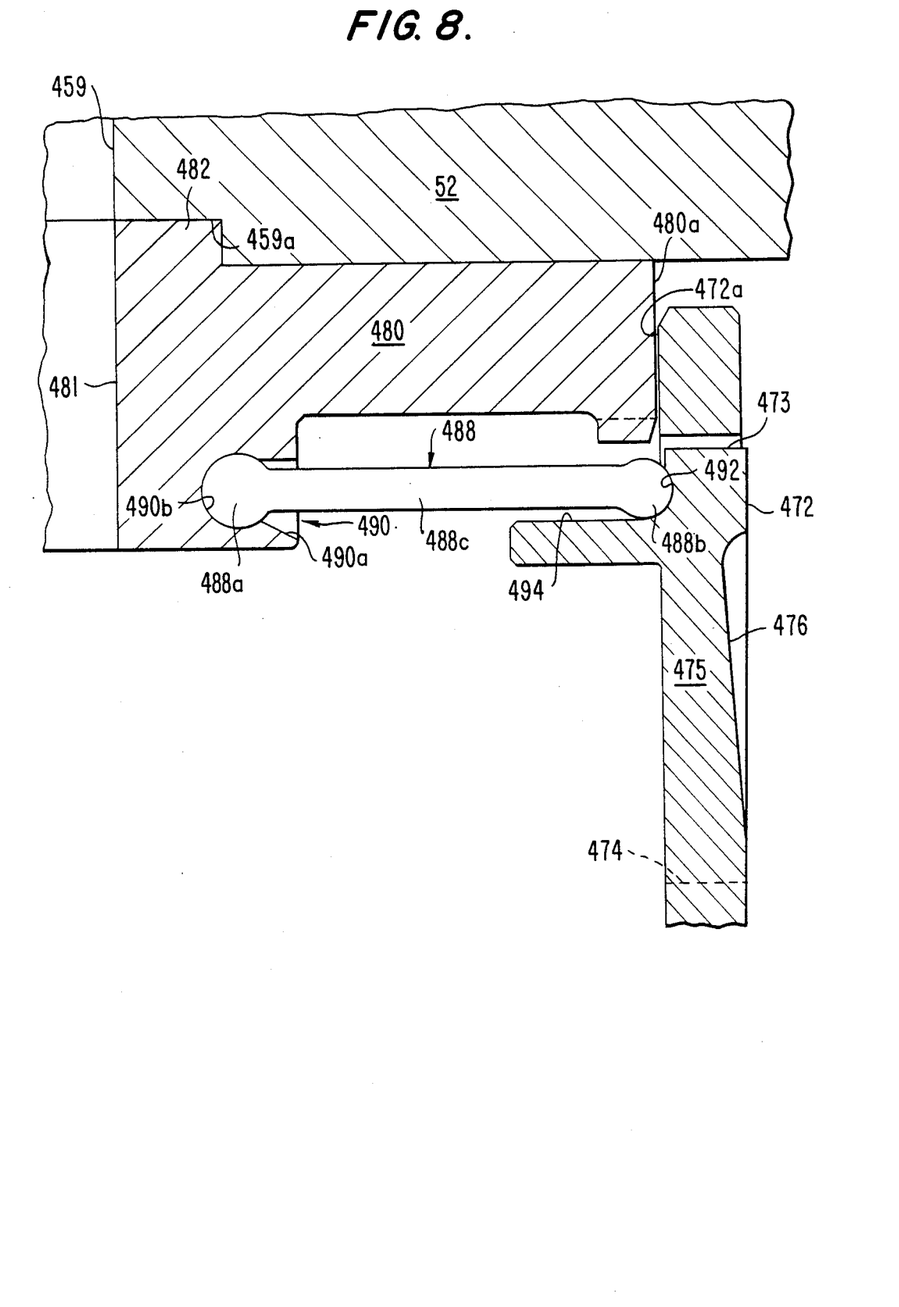
FIG. 8 is a view similar to that of FIG. 3, of a fifth embodiment of the resiliently loaded lateral supports of the present invention, illustrating in solid lines the engaged relationship and in phantom lines the disengaged and retracted relationship thereof.

Yet another embodiment of the invention is shown in FIG. 8 which combines features of the structures of FIGS. 5 and 7 and an alternative structural provision to flexibly restrain relative lateral movement between the mount 480 and the associated sleeve 472. Again, the cylindrical mount 80 is secured to the calandria 52 with the respective central apertures 481 and 459 in alignment. Likewise, an annular extension 482a is received in the annular recess 459a.

Similarly to FIGS. 5 and 7, the cylindrical mount 480 extends radially outwardly a sufficient distance so as to dispose its outer cylindrical surface 480a in close proximity to the inner cylindrical surface 472a of the sleeve 472. Link 488 is pivotally mounted at its first end 488a in the corresponding mounting socket 490b, for limited pivotal movement as defined by the channel 490a. The second, free end 488b is releasably received and engaged in the corresponding socket 492 of the sleeve 472 in the engaged position of link 88, as shown in solid lines, and travels along the ledge 494 during the installation and removal of the calandria assembly 50.

Due to the relatively flat or generally straight, radial configuration of the link 488, link 488 offers little if any resiliency in the lateral, or radial direction. Instead, to provide the desired lateral, resilient loading in the embodiment of FIG. 8, a portion of the sleeve 472 is cut along a top horizontal line shown at 473, and downwardly along two slots extending from the horizontal slot 473 to an integral, resilient hinge 474, and the exterior surface therebetween is machined to a planar surface 476, thereby to define an integral leaf spring 475. The spring 475 is slightly, resiliently deflected by the relatively rigid link 488 when pivoted to the installed position of the calandria 50 as illustrated in FIG. 8. Although not shown in FIG. 8, it readily will be appreciated that upon removal of the calandria 50, link 488 pivots downwardly relatively to the cylindrical mount 480 to the extent permitted by channel 490a of the mounting socket 490 and the second, free end 488b thereof thereupon is withdrawn from socket 492 and moved radially inwardly along the ledge 494, permitting the leaf spring portion 475 to resiliently return to its normal, aligned position with the remainder of the sleeve 472. As in the case of the embodiments of FIGS. 5 and 7, the closely spaced, adjacent surfaces 480a of the cylindrical mount 480 and 472a of the sleeve 472 are protected from abrasion during normal operation by the resilient lateral loading afforded through engagement of the links 488 with the leaf springs 475, but serve under excessive lateral loads as a rigid abutment, limiting any excessive lateral movement of the sleeve 472.

Numerous modifications and adaptations of the lateral support of the invention will be apparent to those of skill in the art, and thus it is intended by the appended claims to encompass all such modifications and adaptations which fall within the true spirit and scope of the invention.

We claim as our invention:

1. A resiliently loaded lateral support for the top, free ends of cantilever-mounted rod guides disposed in closely spaced, parallel axial relationship within the inner barrel assembly of a pressurized water reactor vessel, the inner barrel assembly occupying a central portion of the vessel and being of a vertical height extending from a first plate of lower elevation to a second plate of higher elevation within the vessel, said second plate being moveable axially into and out of assembled relationship with the inner barrel assembly, each said rod guide having a thin sidewall portion of elongated configuration and being of an axial length corresponding substantially to the vertical height of said inner barrel assembly and being mounted at the lower end thereof to the first plate and accommodating in axial, sliding relationship therewithin plural, respectively associated rod clusters, said resiliently loaded top end support comprising, for each said rod guide:

a mount adapted for being secured to the lower surface of the second plate and defining an alignment axis for a corresponding said rod guide within the inner barrel assembly;

a plurality of pivotal mounting sockets formed in said mount at angularly displaced positions about the alignment axis;

an axially extending sleeve affixed at a lower end thereof to the upper end of the associated thin sidewall of said rod guide and of an axial length sufficient to dispose the upper end of said sleeve closely adjacent to but displaced from the lower surface of the second plate when in the assembled relationship;

a plurality of receiving sockets, respectively corresponding to said plurality of pivotal mounting sockets, formed in the upper end of said sleeve;

a corresponding plurality of pivotal links each having a first end and a second, free end, said first ends of said pivotal links being pivotally secured in respective said pivotal mounting sockets and said links extending radially outwardly from the alignment axis with said free ends being pivotable from a downward and radially inward position to an upward and radially outward position about respective axes of rotation associated with the respective first ends and extending in a common plane perpendicular to the alignment axis; and said second, free ends of said pivotal links being releasably and pivotally received in respective said receiving sockets as said mount is moved by said second plate axially into the assembled relationship, said pivotal links, in the assembled relationship, transmitting resilient loading to said mount for maintaining said sleeve and associated rod guide aligned with said alignment axis.

2. A resiliently loaded lateral support as recited in claim 1, wherein:

each of said respectively associated mounting and receiving sockets define parallel axes of rotation of the corresponding, first and second ends of the respectively associated said links.

3. A resiliently loaded lateral support as recited in claim 2, wherein:

each of said mounting sockets comprises a generally cylindrical interior socket portion;

said first end of said associated link has a mating, generally cylindrical exterior surface; and said cylindrical socket portion extends circumferentially through an arc greater than 180° about the associated axis of rotation for retaining said first end of said associated link therein.

4. A resiliently loaded lateral support as recited in claim 3, wherein:

each of said receiving sockets has a generally cylindrical interior surface;

said second, free end of said associated link has a mating, generally cylindrical exterior surface; and said generally cylindrical interior surface of said receiving socket extends through an arc of less than 180° so as to releasably receive said second, free end of said associated link therein.

5. A resiliently loaded lateral support as recited in claim 3, wherein:

said mounting socket further comprises a channel, portion communicating with said socket portion and of a predetermined angular opening defining thereby the extent of downward pivotal movement of said associated link under force of gravity when said second, free end thereof is disengaged from said associated receiving socket.

6. A resiliently loaded lateral support as recited in claim 5, wherein:

said upper end of said sleeve further comprises a radially inwardly extending ledge aligned with said receiving sockets for engaging the free, second ends of said links in said downwardly pivoted position thereof as said mount is moved by said second plate axially into the assembled relationship.

7. A resiliently loaded lateral support as recited in claim 1, wherein:

each said link further comprises a resilient central portion extending between and displacing said first and second ends at a distance greater than that between said mounting and receiving sockets in the assembled relationship, said central portion being normally bowed out of a plane common to the respective axes of pivotal rotation of the first and second ends and being placed under resilient compression and bowed further out of the plane in the assembled relationship for producing the resilient loading on said mount.

8. A resiliently loaded lateral support as recited in claim 1, wherein:

each said link comprises a central portion of U-shaped configuration having respective first and second legs integrally formed with and displacing said first and second ends at a distance greater than that between said mounting and receiving sockets in the assembled relationship, said U-shaped central portion being placed under resilient compression in the assembled relationship for producing the resilient loading on said mount.

9. A resiliently loaded lateral support as recited in claim 1, wherein there are further provided.

a plurality of leaf springs formed in said sleeve, each said leaf spring having a lower end forming an integral hinge with a lower portion of said sleeve and an upper, free end defining therein a respectively corresponding said receiving socket; and each said link includes a central portion integrally and substantially rigidly interconnecting said first and second ends thereof and of a sufficient length in the radial direction so as to resiliently deflect the corresponding leaf spring radially outwardly in the assembled relation for producing the resilient loading on said mount.

10. A resiliently loaded lateral support as recited in claim 1, wherein:
said sleeve defines an interior, generally cylindrical surface of a first predetermined radius relative to the alignment axis; and
said mount has a generally cylindrical surface of a radius nominally less than the predetermined radius of the interior cylindrical surface of said sleeve, relative to said alignment axis, so as to be nominally concentrically spaced therefrom in the assembled relationship, said nominally spaced, respective interior and exterior cylindrical surfaces of said sleeve and said mount providing, an abutment surface for limiting relative lateral movement of said sleeve and said mount in response to transverse loads on said rod guides which exceed the resilient loading transmitted to said mount by said links.

11. A resiliently loaded top end support for each of plural rod guides disposed in closely spaced, parallel axial relationship within the inner barrel assembly of a pressurized water reactor vessel, the inner barrel assembly occupying a central portion of the vessel and being of a vertical height extending from a first plate of lower elevation to s second plate of higher elevation within the vessel, said second plate being moveable axially into and out of assembled relationship with the inner barrel assembly, each said rod guide having a thin sidewall portion of elongated configuration and being of an axial length corresponding substantially to the vertical height of said inner barrel assembly and being mounted at the lower end thereof to the first plate and accommodating in axial, sliding relationship therewithin plural, respectively associated rod clusters, said resiliently loaded top end support comprising, for each said rod guide:
a mount having an exterior surface and upper and lower ends, and adapted for being secured at the upper end thereof to the lower surface of the second plate and depending axially downwardly therefrom and defining an alignment axis for a corresponding said rod guide within the inner barrel assembly;
an axially extending sleeve having an interior surface and upper and lower ends, affixed at the lower end thereof to the upper end of the associated thin sidewall of said rod guide and of an axial length sufficient to dispose the upper end of said sleeve closely adjacent to but displaced from the lower surface of the second plate when in the assembled relationship;
means for releasably interconnecting said sleeve and said mount, said releasably interconnecting means, in the assembled relationship, directly producing resilient lateral loading, substantially perpendicular to the alignment axis, between said mount and said sleeve for maintaining said sleeve and associated rod guide aligned with said alignment axis; and
the upper end of the sleeve receiving the lower end of the mount in substantially coaxial, telescoping relationship with the respective exterior and interior surfaces thereof in spaced, juxtaposed relationship and with the releasable interconnecting means extending between the said, respective exterior and interior surfaces thereof for directly producing said resilient lateral loading therebetween.

12. A resiliently loaded top end support for each of plural rod guides disposed in closely spaced, parallel axial relationship within the inner barrel assembly of a pressurized water reactor vessel, the inner barrel assembly occupying a central portion of the vessel and being of a vertical height extending from a first plate of lower elevation to a second plate of higher elevation within the vessel, said second plate being moveable axially into and out of assembled relationship with the inner barrel assembly, each said rod guide having a thin sidewall portion of elongated configuration and being of an axial length corresponding substantially to the vertical height of said inner barrel assembly and being mounted at the lower end thereof to the first plate and accommodating in axial, sliding relationship therewithin plural, respectively associated rod clusters, said resiliently loaded top end support comprising, for each said rod guide:
a mount adapted for being secured to the lower surface of the second plate and depending axially downwardly there from and defining an alignment axis for a corresponding said rod guide within the inner barrel assembly;
an axially extending sleeve affixed at a lower end thereof to the upper end of the associated thin sidewall of said rod guide and of an axial length sufficient to dispose the upper end of said sleeve closely adjacent to but displaced from the lower surface of the second plate when in the assembled relationship;
means for releasably interconnecting said sleeve and said mount, said releasably interconnecting means, in the assembled relationship, directly producing resilient lateral loading, substantially perpendicular to the alignment axis, between said mount and said sleeve for maintaining said sleeve and associated rod guide aligned with said alignment axis, and comprising plural links each having a first end connected to said mount and a second end free to move pivotally through limited rotation about an axis lying in a common plane generally perpendicular to the alignment axis between a normal, downward and radially inward position and an upward and radially outward position relative to the alignment axis; and
said axially extending sleeve comprising a ledge for engaging the free ends of the corresponding links in the normal, downward and radially inward position and pivotally rotating same to the upward and radially outward position as said mount and associated second plate are moved axially into the assembled relationship, and means for releasably engaging the free ends of the respective links in the assembled relationship for producing resilient loading through said links between said sleeve and said mount.

13. A resiliently loaded top end support as recited in claim 12, wherein:
each said link comprises a resilient material permitting pivotal movement of said free, second end thereof between said downward and inward, and said upward and outward positions; and
said releasably interconnecting means further comprises means for fixedly securing each said link at said first end thereof to said mount.

14. A resiliently loaded top end support as recited in claim 12, further comprising:
plural, pivotal mounting sockets formed in said mount at angularly displaced positions about the alignment axis for pivotally mounting said first ends of said links to said mount, and thereby permitting rotation of said first ends of said links within said pivotal mounting sockets and corresponding pivotal movement of said free, second ends thereof between said downward and inward, and said upward and outward positions.

15. A resiliently loaded top end support as recited in claim 14, wherein:
said mount comprises a first, upper portion having a generally cylindrical exterior surface of a first radius and a plurality of integral, downwardly projecting and radially extending arms of relatively shorter length than the first radius, respectively corresponding to said plurality of links, each said pivotal mounting socket being formed in a corresponding said arm; and
said axially extending sleeve defines an upper, continuous annular portion having a generally cylindrical interior surface of a second, nominally greater radius than said first radius, said respective cylindrical surfaces of said mount and said upper annular portion of said sleeve being nominally maintained in concentric, spaced relationship by the resilient loading produced between said sleeve and said mount by said links.

16. A pressurized water reactor vessel having, in vertically spaced relationship therein, a lower barrel assembly having lower and upper core plates and a plurality of elongated fuel rod clusters mounted between said lower and upper core plates so as to extend in parallel axial relationship therebetween, an inner barrel assembly positioned above said lower barrel assembly and housing therewithin a plurality of rod guides of elongated configuration disposed in parallel axial relationship and affixed at the respective lower ends thereof to the upper core plate, each said rod guide having a thin sidewall portion of elongated configuration and being of an axial length corresponding substantially to the vertical height of said inner barrel assembly, and a calandria assembly having a lower calandria plate and being axially moveable into and out of assembled relationship with the inner barrel assembly, the lower calandria plate being disposed closely adjacent the upper ends of said rod guides when in assembled relationship with the inner barrel assembly, and means at the interface between the lower calandria plate and the upper ends of said rod guides for mounting the top ends of said rod guides to the lower calandria plate when the calandria assembly is assembled with the inner barrel assembly, comprising:
a mount adapted for being secured to the lower surface of the lower calandria plate and defining an alignment axis for a corresponding said rod guide within the inner barrel assembly;
a plurality of pivotal mounting sockets formed in said mount at angularly displaced positions about the alignment axis;
an axially extending sleeve affixed at a lower end thereof to the upper end of the associated thin sidewall of said rod guide and of an axial length sufficient to dispose the upper end of said sleeve closely adjacent to but displaced from the lower surface of the lower calandria plate when in the assembled relationship;
a plurality of receiving sockets, respectively corresponding to said plurality of pivotal mounting sockets, formed in the upper end of said sleeve;
a corresponding plurality of pivotal links each having a first end and a second, free end, said first ends of said pivotal links being pivotally and said links extending radially outwardly from the ; alignment axis with said free ends being pivotable from a downward and radially inward position to an upward and radially outward position about respective axes of rotation associated with the respective first ends and extending in a common plane perpendicular to the alignment axis; and
said second, free ends of said pivotal links being releasably and pivotally received in respective said receiving sockets as said mount is moved by said lower calandria plate axially into the assembled relationship, said pivotal links, in the assembled relationship, transmitting resilient loading to said mount for maintaining said sleeve and associated rod guide aligned with said alignment axis.

17. A pressurized water reactor vessel as recited in claim 16, wherein:
each of said respectively associated mounting and receiving sockets define parallel axes of rotation of the corresponding, first and second ends of the respectively associated said links.

18. A pressurized water reactor vessel as recited in claim 17, wherein:
each of said mounting sockets comprises a generally cylindrical interior socket portion;
said first end of said associated link has a mating, generally cylindrical exterior surface; and
said cylindrical socket portion extends circumferentially through an arc greater than 180° about the associated axis of rotation for retaining said first end of said associated link therein.

19. A pressurized water reactor vessel as recited in claim 18, wherein
each of said receiving sockets has a generally cylindrical interior surface;
said second, free end of said associated link has a mating, generally cylindrical exterior surface; and
said generally cylindrical interior surface of said receiving socket extends through an arc of less than 180° so as to releasably receive said second, free end of said associated link therein.

20. A pressurized water reactor vessel as recited in claim 18, wherein:
said mounting socket further comprises a channel portion communicating with said socket portion and of a predetermined angular opening defining thereby the extent of downward pivotal movement of said associated link under force of gravity when said second, free end thereof is disengaged from said associated receiving socket.

21. A pressurized water reactor vessel as recited in claim 20, wherein:
said upper end of said sleeve further comprises a radially inwardly extending ledge aligned with said receiving sockets for engaging the free, second ends of said links in said downwardly pivoted position thereof as said mount is moved by said lower calandria plate axially into the assembled relationship.

22. A pressurized water reactor vessel as recited in claim 16, wherein:
each said link further comprises a resilient central portion extending between and displacing said first and second ends at a distance greater than that between said mounting and receiving sockets in the assembled relationship, said central portion being normally bowed out of a plane common to the respective axes of pivotal rotation of the first and second ends and being placed under resilient compression and bowed further out of the plane in the assembled relationship for producing the resilient loading on said mount.

23. A pressurized water reactor vessel as recited in claim 16, wherein:

each said link comprises a central portion of U-shaped configuration having respective first and second legs integrally formed with and displacing said first and second ends at a distance greater than that between said mounting and receiving sockets in the assembled relationship, said U-shaped central portion being placed under resilient compression in the assembled relationship for producing the resilient loading on said mount.

24. A pressurized water reactor vessel as recited in claim 16, wherein there are further provided:

a plurality of leaf springs formed in said sleeve, each said leaf spring having a lower end forming an integral hinge with a lower portion of said sleeve and an upper, free end defining therein a respectively corresponding said receiving socket; and each said link includes a central portion integrally and substantially rigidly interconnecting said first and second ends thereof and of a sufficient length in the radial direction so as to resiliently deflect the corresponding leaf spring radially outwardly in the assembled relation for producing the resilient loading on said mount.

25. A pressurized water reactor vessel as recited in claim 16, wherein:

said sleeve defines an interior, generally cylindrical surface of a first predetermined radius relative to the alignment axis; and said mount has a generally cylindrical surface of a radius nominally less than the predetermined radius of the interior cylindrical surface of said sleeve, relative to said alignment axis, so as to be nominally concentrically spaced therefrom in the assembled relationship, said nominally spaced, respective interior and exterior cylindrical surfaces of said sleeve and said mount providing an abutment surface for limiting relative lateral movement of said sleeve and said mount in response to transverse loads on said rod guides which exceed the resilient loading transmitted to said mount by said links.

* * * * *